March 10, 1964  F. L. HERMACH  3,124,747
COAXIAL THERMAL VOLTAGE CONVERTER

Filed May 11, 1960  2 Sheets-Sheet 1

INVENTOR
Francis L. Hermach

BY David Robbins
John C. Stahl  ATTORNEY

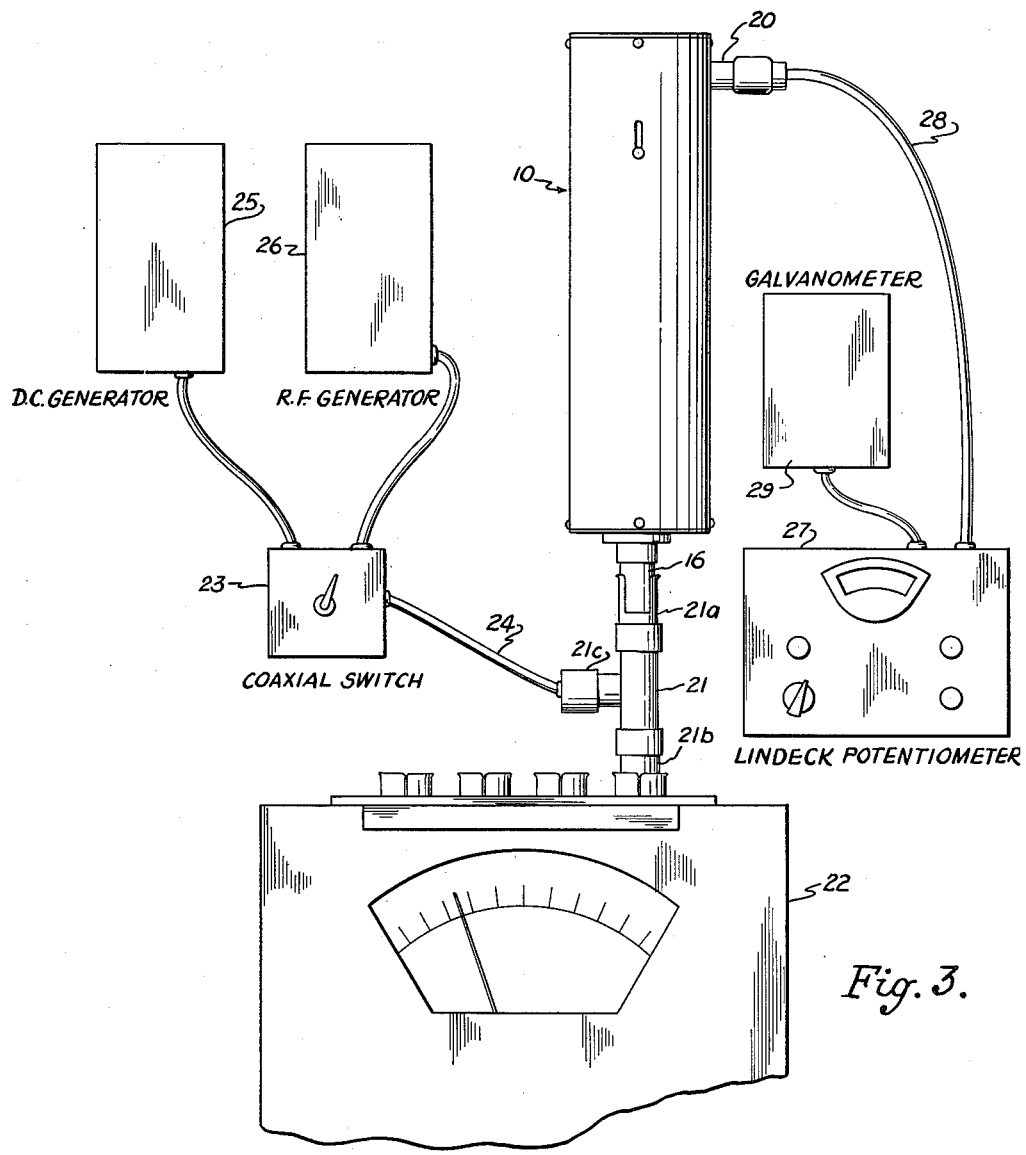

United States Patent Office 3,124,747
Patented Mar. 10, 1964

3,124,747
COAXIAL THERMAL VOLTAGE CONVERTER
Francis L. Hermach, Silver Spring, Md., assignor to the United States of America as represented by the Secretary of Commerce
Filed May 11, 1960, Ser. No. 28,502
3 Claims. (Cl. 324—95)

The present invention relates to a thermal voltage converter and more particularly to a coaxial thermal voltage converter which will give highly accurate voltage measurements from audio to ultrasonic frequencies by A.C.-D.C. transfer techniques.

The increasing use and greater accuracy required in measurements by science and industry have led to increasing demands for the accurate standardization of R.M.S. voltmeters at frequencies upward from the power frequencies to the ultrasonic frequencies. Several types of instruments have heretofore been considered in choosing transfer standards to cover this full range of frequencies. Electrodynamic instruments have been highly developed for standards measurements at the commercially important power frequencies and can be used, with proper corrections, up to about 2,000 c.p.s. However, unavoidable inductance and stray capacitance errors limit their useful frequency range. Electrostatic instruments are useful over wide frequency ranges but because of their low-torque-weight ratio at low voltage are not readily adaptable for the low voltage range desired.

The R.F. thermal voltage converter of this invention makes use of the transfer principle in which a D.C. voltage is substituted for the A.C. voltage to be measured. The D.C. voltage is adjusted to give the same output E.M.F. of a thermoelement that was obtained with the A.C. voltage applied, and is measured with a potentiometer or other suitable means. Thus only good short-time stability, high precision of reading and small known frequency influence are required of the transfer standard. An accuracy of 0.1% or better may be obtained up to at least 10 megacycles (mc.) per second and 0.2% at 30 mc. in accordance with the principles of this invention.

An object of the present invention is to provide an R.F. voltage converter that is very accurate over a very wide frequency range.

Another object of the present invention is to provide a R.F. voltage converter of the A.C.-D.C. transfer type in which the long-time stability characteristics of the thermoelement are not important.

Another object of the present invention is to provide a R.F. voltage converter having a very high degree of accuracy.

Still another object of this invention is to provide a standard that is not sensitive to frequency.

A further object of this invention is to provide a high frequency, low voltage standard that is calibrated by the use of a direct current.

Other objects and features of the invention will become apparent to those skilled in the art as the disclosure is made in the following detailed description of a preferred embodiment of the invention as illustrated in the accompanying sheet of drawing in which:

FIG. 3 illustrates a typical set-up in which the device of FIG. 1 may be used to measure voltage in accordance with the principles of the present invention.

Figure 1:
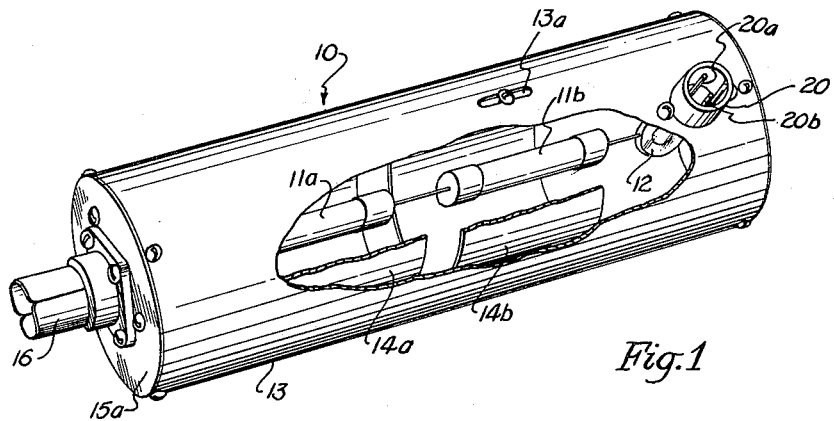
FIG. 1 is an isometric view of a preferred embodiment of the thermal voltage converter of the subject invention.

Referring now to the drawings, wherein like reference characters designate like or corresponding parts throughout the several views, in FIG. 1 reference numeral 10 designates the thermal voltage converter of this invention.

Each converter 10 consists of one or more cylindrical, deposited-carbon dropping resistors 11a—11b connected in series with a U.H.F. thermoelement 12, which includes a thermocouple. To reduce the effects of distributed capacitance between said resistors and an outer cylinder 13, one or more cylindrical inner shields 14a—14b are concentrically positioned about said resistors. Circular metallic discs 15a—15b are secured to the ends of cylinder 13 in a conventional manner. Preferably the cylinder 13 and discs 15a—15b are constructed of brass or the like; the cylinder is 2.5 inches in diameter and 7.5 inches in length while the discs are approximately 3/16 inch in thickness.

It will be apparent that cylinder 13 forms the outer conductor of a coaxial line, while resistors 11a—11b and the heater of the thermoelement 12 form the inner conductor of the line. The output of the line is short-circuited by disc 15b.

Figure 2:
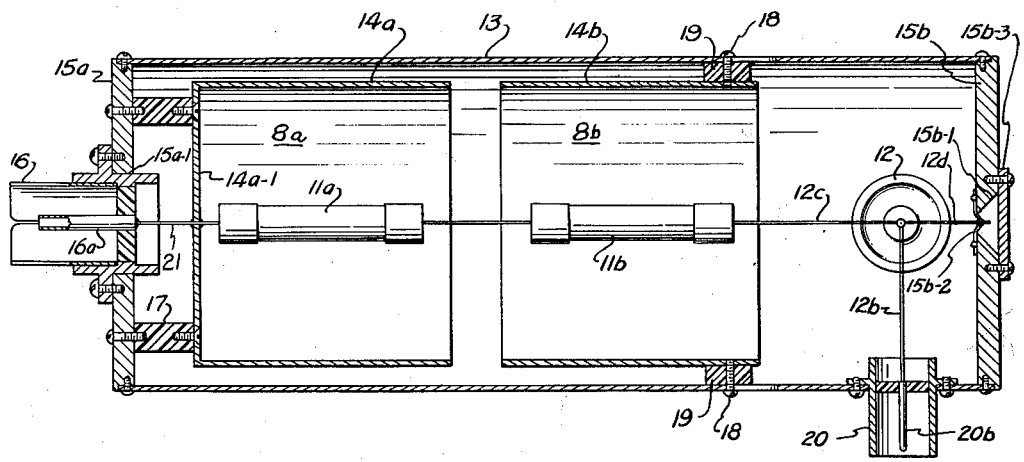
FIG. 2 is a longitudinal sectional view of the converter.

A coaxial input connector 16 such as is well known to the art passes through a bore 15a–1 in disc 15a and is mounted thereto by screws or the like. Disc 15a is a portion of the return path to the sleeve of connector 16 in the circuit described below. As best seen in FIG. 2 of the drawings, a bore 15b–1 is provided in the center of disc 15b, the terminals of a cross wire 15b–2 are soldered to the inner surface of the disc 15b in such a manner that the cross wire passes over the bore 15b–1 thereby providing a frame upon which the free end 12d of the thermocouple heater of thermoelement 12 is to be attached in a manner hereinafter to be described. An end plate 15b–3 attaches to disc 15b and covers bore 15b–1.

Referring again to FIG. 2 of the drawings, in a preferred embodiment of the invention two cylindrical shields 14a—14b, approximately 2 inches in diameter and constructed of brass or the like, are positioned concentric about the resistors 11a—11b. The inner shield 14a is fixedly positioned about the resistor 11a and includes an end plate 14a–1 integral therewith. Shield 14a is supported within the cylinder by insulating posts 17 which connect end plate 14a–1 to disc 15a, respectively, in a conventional manner.

The shield 14b (see FIG. 2) is open ended. Axial adjustment and alignment of the shield 14b along the axis of resistor 11b is provided by screws 18 which pass through elongated slots 13a in the cylinder and insert into said shield. An insulating ring 19 of polystyrene or the like permits centering of the shield within the cylinder 13. Shield 14b is grounded to cylinder 13 through screws 18, as shown in FIGS. 1 and 2.

A conventional two-pin connector 20 is secured to cylinder 13 as illustrated in FIGS. 1 and 2.

A great advantage of thermoelements for use in A.C.-D.C. transfer measurements is the almost complete electrical isolation of the input and output circuits. The U.H.F. thermoelement 12 utilized in the practice of this invention is an acorn-shape, evacuated glass bulb and includes a thermocouple which has a small bead between the heater and hot junctions, respectively, to electrically but not thermally isolate the elements. The operation of such a thermoelement is well known to the art and is generally discussed in NBS Journal of Research, vol. 48, No. 2, p. 121, February 1952. The frequency error of such a U.H.F. thermoelement is small to over 100 mc.

One commercially available deposited carbon resistor suitable for use in the subject disclosure is 1/8 inch in diameter and 2 inches in length and is vacuum sealed in a 3/16 inch diameter glass cylinder. The residual reactances of such a resistor are much smaller than those of wire-wound resistors and can be computed at least approximately so that frequency errors can be estimated. It is to be understood, of course, that the invention is not limited to the particular type of thermoelement or resistor heretofore described but that any such element having the desired characteristics may be utilized.

Additional data on the operating characteristics of the thermoelements and resistors to be utilized in the voltage converter of this invention is given in Table 1. The value of the resistance of each series, dropping resistor 11a—11b is selected so that when the rated voltage indicated in Table 1 is applied to input connector 16, the rated current of the thermocouple heater of thermoelement 12 is 10 ma. and the heater resistance is 25 ohms.

It is to be noted that the 50-volt converter contains a single resistor and a fixed inner shield similar to shield 14a in FIG. 2 whereas the 100- and 200-volt converters have two resistors of equal value. Each of the 10 ma. U.H.F. thermoelements utilized to obtain the data given in Table 1 have an output of about 7 mv. at rated current.

TABLE 1

*Thermal Converters*

| Converter Rating Volts | Rated Current, ma. | Heater Resistance, Ohms | Series Resistor, Kilohms |
|---|---|---|---|
| 50 | 10 | 25 | 5 |
| 100 | 10 | 25 | 10 |
| 200 | 10 | 25 | 20 |

Each converter 10 is assembled by first soldering the resistors 11a—11b in series and soldering the free end 12c of resistor 11b to the thermocouple heater of thermoelement 12. The input lead of resistor 11a is soldered to end plate 14a–1 after which shield 14a is connected to disc 15a in the manner heretofore described. A short lead 21 connects end plate 14a–1 to the insulated inner conductor 16a of the coaxial input connector. Disc 15a is conencted to the cylinder 13 after which shield 14b is positioned within cylinder 13.

The two thermoelement leads 12a—12b are soldered to the respective pins 20a—20b of output connector 20. As illustrated in FIG. 2 of the drawings only one output lead 12b is shown. In the preferred embodiment of the invention the plane of the thermoelement lead 12b and the pins 20a—20b of connector 20 are at right angles to the axis of the cylinder so that minimum E.M.F. is induced in the output circuit. Voltages of more than a few millivolts can cause significant errors by joule heating of the thermoelement.

Disc 15b is connected to cylinder 13 and the free end 12d of the thermocouple heater of thermoelement 12 is passed through the bore 15b–1 and is soldered to cross wire 15b–2 which, as indicated above, has terminals soldered to the inner surface of disc 15b. In this manner, the cross wire provides a convenient means for attaching the free end 12d of the thermocouple heater to disc 15b.

It will be apparent that when a voltage source is applied to connector 16, current will flow in the loop that comprises the inner conductor 16a, resistors 11a, 11b, the thermocouple heater in thermoelement 12, cross wire 15b–2, disc 15b, cylinder 13, disc 15a and the outer conductor of connector 16. A voltage will then appear across thermoelement leads 12a—12b.

*Theory*

A detailed discussion of low-voltage converters (without inner shields) is given in Paper No. 60–135 by Francis L. Hermach and Earl S. Williams published by the American Institute of Electrical Engineers in "Communication and Electrons" No. 49 (1960).

As specified in said paper, for high-voltage converters wherein $k<0.038$, ($k=L/CR^2$), distributed capacitance from the resistor to the cylinder predominates. At a given frequency and geometry, the resultant error is proportional to the square of the resistance. This can be minimized by the preferred embodiment of the invention as shown in FIGS. 1 and 2 in which the inner cylindrical shields are used. One of the shields is connected to the input lead, thus providing essentially two transmission lines 8a and 8b in series. The transmission line 8a comprises shield 14a and resistor 11a while transmission line 8b comprises shield 14b and resistor 11b. If $R_h \ll R$, wherein $R_h$ is the heater resistance and is much less than the value of a single resistor $R$, application of transmission line formulas give for the desired trans-impedance $$Z_c = \sqrt{\frac{Z_1}{Y_1}} \tanh \sqrt{Z_1 Y_1} \cosh \sqrt{Z_2 Y_2} + \sqrt{\frac{Z_2}{Y_2}} \sinh \sqrt{Z_2 Y_2} \tag{1}$$

In Equation 1 $Z_c$ is the trans-impedance; $Z=R+j\omega L$, $Y=j\omega C$, and the subscripts 1 and 2 refer to the transmission lines 8a and 8b, respectively, of FIG. 2; the resistance of the thermoelement is neglected.

If
$$Z_1 = Z_2 = Z \text{ and } Y_1 = Y_2 = Y$$
we have
$$Z_c = \frac{2Z}{\sqrt{ZY}} \sinh \sqrt{ZY} \tag{2}$$

The A.C.-D.C. difference, $S_0$, of converter 10 is defined as $$S_0 = \frac{|V_{ac}| - V_{dc}}{V_{dc}}$$

where $V_{ac}$ and $V_{dc}$ are the alternating and direct voltages required to obtain the same response (output E.M.F.) of converter 10.

The parameter, $a$, is defined as $$a = \omega C R$$

Thus, the trans-impedance is twice that of either line, and the A.C.-D.C. difference, $S_0$, will be that of half the total line. The parameter, $a$, will then be one-fourth that for a line of the same dimensions without inner shields. Thus, for a given frequency for which $a<1$ the use of the double shield rather than a single cylinder of the same diameter should reduce the frequency error (for resistors of the same value and dimensions) by a factor of 16.

A more detailed analysis indicates that even further improvement may be possible. For these converters $k \ll 0.038$, so that the series inductance of each line may be neglected. By expanding the hyperbolic functions of Equation 1 and discarding higher order terms it can be shown that $S_0 \approx 0$ when $l_1/l_2 \approx 1.032$, where $l_1$ and $l_2$ are the lengths of the transmission lines 8a and 8b, respectively, of FIG. 2, and $a<1$.

It will be apparent from the mathematics just presented that when shield 14b is omitted the second transmission line 8b will comprise resistor 11b and cylinder 13. Likewise, when only fixed shield 14a and resistor 11a are used, the dimensions of the resistor are selected so that a portion of the same extends outside the shield. Then, the portion of the resistor 11a not encompassed by shield 14a and cylinder 13 form transmission line 8a.

As indicated above, cylinder 13 and discs 15a—15b form a transmission line and the cylinder also encloses transmission lines 8a and 8b. Since each transmission line is of simple geometry, comparatively elementary mathematics may be used to calculate the A.C.-D.C. difference, $S_0$, of converter 10 in FIG. 2. When greater precision is desired, measurements are made, using techniques well known in the art, from which $S_0$ is calculated and shield 14b is adjusted for the minimum A.C.-D.C. difference. As shown by the mathematics, $S_0$ will be approximately zero when the ratio of the length of line 8a to the length of line 8b is approximately 1.032.

The voltage converter of this invention is most conveniently used to measure the A.C.-D.C. difference or frequency influence of other R.M.S. instruments such as thermocouple voltmeters. A typical set-up for such measurement is shown in FIG. 3 of the drawings wherein the input connector 16 of the voltage converter 10, heretofore described in detail, inserts into one terminal 21a of a conventional T fitting 21. The instrument to be tested 22 is connected to terminal 21b while a coaxial switch 23 connects with terminal 21c by a coaxial cable 24 or the like. A D.C. generator 25 and R.F. generator 26 also connect to the switch 23. The R.F. generator should preferably be of at least 5 watts output; good voltage stability is required but only moderate frequency accuracy and stability are needed. Connector 20 is connected to a completely shielded Lindeck potentiometer 27 by means of a two-conductor shielded cable 28. A galvanometer 29 attaches to potentiometer 27.

In a typical operation of the test set-up in FIG. 3, coaxial switch 23 is positioned so that the A.C. voltage, obtained from R.F. generator 26, is applied through T-fitting 21 to converter 10 and to the instrument 22, which is undergoing test. The magnitude of the A.C. voltage is adjusted until a desired deflection is produced on the scale of the instrument. A small D.C. voltage appears on connector 20 and is applied to potentiometer 27, which is adjusted for a null deflection of galvanometer 29.

Immediately after these adjustments are made, switch 23 is positioned so that the output of D.C. generator 25 is applied in parallel to instrument 22 and converter 10. The output voltage of the D.C. generator is then adjusted to provide the same deflection on the scale of instrument 22 as when the output of R.F. generator 26 was applied to the instrument. The resulting deflection of galvanometer 29 is observed with the controls of potentiometer 27 left undisturbed.

Using the latter deflection of the galvanometer, the A.C.-D.C. difference, $S_0$, of instrument 22 is readily computed by simple formulas and can then be used as corrections in calibrating the instrument. When these corrections are used during a subsequent calibration process, only D.C. voltages need be applied to instrument 22.

In the preferred embodiment of the invention a Lindeck potentiometer 27 rather than a millivoltmeter is connected to the output E.M.F. of the converter to provide high resolution. The potentiometer has ranges of 0.15, 0.75, 7.5, and 15 mv., the two lowest ranges are to be used for sensitivity checks. The advantages of this potentiometer are its low thermal E.M.F. (less than 1 mv.) and its freedom from drift (much less than 0.01%/minute under ordinary laboratory conditions). Also, the shield of the Lindeck potentiometer provides reasonable immunity from induced fields. In several tests at 10 mc. a current of 2 ma. from the shield to ground through the cable from the potentiometer to the converter caused no significant error.

When used with a galvanometer having a sensitivity of 200 mm./μa., the potentiometer provides a selected resolution of either 2 or 10 μv. per mm. deflection.

For A.C. measurements, a D.C. potentiometer of 0.1% accuracy or better is required to measure the reference voltage. A deflection potentiometer and volt box (not shown) or an automatic self-balancing potentiometer ("digital voltmeter") may be conveniently used and connected to another T connector at 21c. For testing electronic voltmeters the form factor and crest factor of the A.C. source must be within 0.1% of the values for a sine wave (1.111 and 1.414, respectively) since most electronic voltmeters respond essentially to the average or crest (peak) values. Since these factors are dependent upon the phase angle as well as the magnitude of each harmonic it is ordinarily necessary to insure that the ratio of the magnitude of the $n$th harmonic to the fundamental does not exceed $0.1n\%$ when an average-reading instrument is tested and 0.1% when a crest reading instrument is tested. The results should then differ from those obtained with a sine wave by less than 0.1%.

Although long-time stability is not required of these converters, fluctuations or drifts in E.M.F. for the short time between the A.C. used and the D.C. calibration must be less than the desired accuracy. Such changes can arise from self-heating effects and ambient temperature changes, and from thermal E.M.F.'s and other changes in the Lindeck potentiometer. Tests show that the largest source of drift is the heating of the thermoelement by the power dissipated in the resistor. The initial change is as large as 0.2% per minute but decreases exponentially with time and is less than 0.05%/min. after 5 minutes. Since D.C. calibrations are easily made within 30 seconds of the A.C. readings, this self-heating error is not significant in A.C. tests if a short warm-up period is allowed. It is almost completely eliminated by the procedure used in the A.C.-D.C. transfer test heretofore described. The effect of ambient temperature changes (the thermoelements have temperature coefficients up to 0.1%/° C.) should also be insignificant in a laboratory with reasonable temperature control.

For transfer measurements the A.C.-D.C. difference of the converter must be known to the full accuracy desired. The general principles on which such determinations are based have heretofore been given. In the frequency range studied, the major error is caused by the reactance. For a given converter this error should be independent of voltage level. Thus it was desirable to evaluate the relative errors by intercomparing converters of adjacent voltage ranges to determine their difference in frequency response. A complete series of such comparisons was made at two voltage levels for each pair of converters at frequencies up to 40 mc. In Table 2 the two converters designated A and B, respectively, were connected in parallel to a coaxial lead through a T fitting and a shielded potentiometer was connected to each output. The converters were then supplied in succession with alternating, direct, reversed-direct and alternating voltage. Each voltage was adjusted to produce the same E.M.F. of the higher range converter and the E.M.F. of the other converter was observed. From the differences in E.M.F. (directly determined from the differences in deflection of the galvanometer of the Lindeck potentiometer) the differences in the frequency response of the converters were determined. In these tests the movable inner shields of the 100- and 200-volt converters were adjusted for minimum difference over the desired frequency range by comparison with the 20- and 50-volt converters.

TABLE 2

*Comparative A.C.-D.C. Differences of Voltage Converters*

| Voltage Range | | Applied Volts | Comparative AC-DC Difference, D, (Percent) | | | | | | |
|---|---|---|---|---|---|---|---|---|---|
| Converter A | Converter B | | 0.1 mc. | 1 mc. | 5 mc. | 10 mc. | 20 mc. | 30 mc. | 40 mc. |
| 20 | 50 | 15 | 0.00 | 0.00 | ---- | ---- | ---- | ---- | -0.04 |
| 20 | 50 | 20 | ---- | ---- | ---- | 0.00 | 0.00 | -0.01 | -0.04 |
| 20 | 100 | 20 | 0.00 | 0.00 | +0.02 | +0.07 | +0.24 | +0.33 | +0.17 |
| 50 | 100 | 50 | ---- | 0.00 | ---- | ---- | ---- | +0.33 | ---- |
| 50 | 200 | 50 | +0.01 | 0.00 | -0.02 | -0.06 | -0.04 | +0.19 | +0.57 |
| 100 | 200 | 90 | ---- | 0.00 | ---- | ---- | ---- | -0.14 | ---- |

The results of these intercomparisons from 0.1 to 40 mc. as given in Table 2 show that for each pair of converters the relative A.C.-D.C. differences are independent of the applied voltage to 0.02% or less, and are less than 0.4% up to 30 mc. They are less than 0.05% to 20 mc., without exception and without evidence of systematic error.

Other tests shown that even at 40 mc. the current along the heater of a single thermoelement terminating a voltage converter is well within 0.1% of the value at the midpoint of the heater.

The response of a 1-volt converter (not given in Table 2), with a shielded D.C. millivoltmeter connected to its output, was determined to better than 1% at frequencies from 1 to 400 mc. using the bolometer bridge of Selby and Behrent, described in the NBS Journal of Research, vol. 44, pp. 15–30, 1950.

Based on the above consideration a value of zero was assigned to the A.C.-D.C. difference of the 1-volt converter to 40 mc. and the A.C.-D.C. differences of the converters were determined utilizing the intercomparison data given in Table 1. The results, rounded off to the nearest 0.05% to 10 mc. and 0.1% to 40 mc., is given in Table 3.

TABLE 3

*A.C.-D.C. Differences of Voltage Converters*

| Rated Voltage, Volts | Percent A.C.-D.C. Differences Observed to— | | | | |
|---|---|---|---|---|---|
| | 5 mc. | 10 mc. | 20 mc. | 30 mc. | 40 mc. |
| 50 | <0.05 | <0.05 | 0.0 | 0.0 | 0.0 |
| 100 | <0.05 | +0.05 | +0.2 | +0.3 | +0.1 |
| 200 | <0.05 | −0.05 | 0.0 | +0.2 | +0.5 |

To verify these results at larger A.C.-D.C. differences, the 50-volt converter was tested before its inner shield was installed. The measured A.C.-D.C. difference at 40 mc. was +1.3% and was accurately proportional to the square of the frequency. The computed values were 40% smaller, indicating that the effective length of the resistor (end effect) was 1.2 times the actual length. At 40 mc. the measured A.C.-D.C. difference was changed by less than 0.02% when the resistor was mounted 3/32 inch off the axis of the cylinder, indicating that exact centering is not critical even when the errors are large.

*Conclusion*

The use of cylindrical-film resistors in series with a thermoelement in a coaxial line produces a single-range thermal voltage converter which is useful as an A.C.-D.C. transfer instrument from 3 c.p.s. to at least 40 mc. with unusually high accuracy. These R.M.S. voltage converters are inexpensive, simple to construct, and can be used quickly and easily to make A.C.-D.C. difference tests (or A.C.-A.C. difference tests) to determine the frequency influence of other R.M.S. instruments to 0.1% or better to at least 10 mc. and to 0.2% to 30 mc. Direct A.C. measurements are made by the transfer technique which in most cases can be arranged for reasonable simplicity. With sources of suitable waveform, average-reading and crest-reading instruments may also be calibrated. In all of these applications the applied frequency need not be closely determined or held because of the flat frequency response of these voltage converters.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention.

What is claimed is:

1. In a thermal voltage converter, a thermocouple having a heater element and first and second output terminals, an output connector having first and second pins connected to said first and second output terminals, respectively, a coaxial line having an outer and inner conductor, the inner conductor of said coaxial line comprising said heater element and resistive impedance means connected in series, first and second end members of conductive material, each end member being connected across a respective end of the outer conductor of said coaxial line, a fitting having an outer conductive sleeve and an inner conductor insulated therefrom, the outer sleeve being connected to said first end member, the inner conductor of said coaxial line being connected between the inner conductor of said fitting and the second end member, and a shield of conductive material positioned between the inner and outer conductor of said coaxial line and about a portion of said resistive impedance means, said shield being connected to the inner conductor of said fitting.

2. In a thermal voltage converter, a thermocouple having a heater element and first and second output terminals, an output connector having first and second pins connected to said first and second output terminals, respectively, a coaxial line having an outer and inner conductor, the inner conductor of said coaxial line comprising said heater element, a first resistor and a second resistor connected in series, first and second end members of conductive material, each end member being connected across a respective end of the outer conductor of said coaxial line, a fitting having an outer conductive sleeve and an inner conductor insulated therefrom, the outer sleeve being connected to said first end member, the inner conductor of said coaxial line being connected between the inner conductor of said fitting and the second end member, and first and second shields of conductive material positioned between the inner and outer conductor of said coaxial line and about said first and second resistors, respectively, said first shield being connected to the inner conductor of said fitting and the second shield to the outer conductor of said coaxial line.

3. The thermal converter set forth in claim 2 wherein said second resistor has a longitudinal axis, means for mounting said second shield in such a manner as to permit selective adjustment of the position of the same along the longitudinal axis of said second resistor.

References Cited in the file of this patent

UNITED STATES PATENTS

| 2,403,252 | Wheeler | July 2, 1946 |
| 2,464,277 | Webber | Mar. 15, 1949 |
| 2,474,795 | Van Beuren | June 28, 1949 |
| 2,590,477 | Weber | Mar. 25, 1952 |
| 2,702,368 | Bird | Feb. 15, 1955 |
| 2,884,595 | Stevens | Apr. 28, 1959 |
| 2,884,597 | Miller | Apr. 28, 1959 |

OTHER REFERENCES

A.I.E.E. Transaction, by Hermach and Williams, Paper No. 60-135, Dec. 10, 1959.